US008933771B2

(12) United States Patent
Huang et al.

(10) Patent No.: US 8,933,771 B2
(45) **Date of Patent: *Jan. 13, 2015**

(54) CONTROL OF LEAKAGE INDUCTANCE

(71) Applicant: The Boeing Company, Chicago, IL (US)

(72) Inventors: Jian Huang, Everett, WA (US); Jeffrey J. White, Shoreline, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/033,722

(22) Filed: Sep. 23, 2013

(65) Prior Publication Data

US 2014/0022037 A1 Jan. 23, 2014

Related U.S. Application Data

(63) Continuation of application No. 12/212,922, filed on Sep. 18, 2008, now Pat. No. 8,593,244.

(51) Int. Cl.

| | |
|---|---|
| ***H01F 27/28*** | (2006.01) |
| ***H01F 27/32*** | (2006.01) |
| ***H01F 38/12*** | (2006.01) |
| ***G01V 3/10*** | (2006.01) |
| ***H01F 27/34*** | (2006.01) |
| ***H01F 27/38*** | (2006.01) |

(52) U.S. Cl.

CPC .............. *H01F 27/346* (2013.01); *H01F 27/38* (2013.01); *H01F 27/289* (2013.01)
USPC .......... 336/73; 336/170; 336/84 C; 336/84 R; 336/84 M

(58) Field of Classification Search

CPC ....... H01F 27/263; H01F 27/255; H01F 3/14; H01F 3/10; H01F 37/00
USPC .......................................... 336/221, 212, 222
See application file for complete search history.

(56) References Cited

U.S. PATENT DOCUMENTS

| | | | | |
|---|---|---|---|---|
| 1,724,935 A * | 8/1929 | Huet | ............................ | 336/145 |
| 2,311,128 A | 2/1943 | Ranney | | |
| 2,406,045 A * | 8/1946 | Stevens | ........................... | 336/73 |
| 2,553,324 A | 5/1951 | Lord | | |
| 2,633,561 A | 3/1953 | Hewlett, Jr. | | |
| 3,237,090 A * | 2/1966 | Royer et al. | .................. | 323/340 |
| 3,895,017 A * | 7/1975 | Lesher et al. | ................. | 546/312 |
| 3,965,408 A | 6/1976 | Higuchi et al. | | |

(Continued)

FOREIGN PATENT DOCUMENTS

| | | |
|---|---|---|
| JP | 59172709 A | 9/1984 |
| JP | 61166015 A | 7/1986 |

*Primary Examiner* — Elvin G Enad
*Assistant Examiner* — Kazi Hossain
(74) *Attorney, Agent, or Firm* — Toler Law Group, PC

(57) ABSTRACT

According to an embodiment, a transformer is provided that includes a first conductive coil wound about a first coil axis and a second conductive coil wound about a second coil axis. The second conductive coil is disposed proximate to the first conductive coil and the second coil axis is substantially parallel to the first coil axis. A closed-loop conductive winding is disposed proximate to the first conductive coil and the second conductive coil. The closed-loop conductive winding is wound about a loop axis at least one time where the loop axis is substantially parallel to the first coil axis and the second coil axis.

13 Claims, 9 Drawing Sheets

(56) References Cited

U.S. PATENT DOCUMENTS

| | | | | |
|---|---|---|---|---|
| 4,907,246 | A | 3/1990 | Kleiner | |
| 5,485,362 | A | 1/1996 | Archer | |
| 5,546,065 | A | 8/1996 | Vinciarelli et al. | |
| 5,719,544 | A | 2/1998 | Vinciarelli et al. | |
| RE38,082 | E * | 4/2003 | Vlahu | 336/69 |
| 6,653,924 | B2 | 11/2003 | Vinciarelli et al. | |
| 6,748,645 | B1 * | 6/2004 | Venet et al. | 29/602.1 |
| 6,965,291 | B2 | 11/2005 | Haugs et al. | |
| 7,095,636 | B2 | 8/2006 | Sarlioglu | |
| 7,268,658 | B1 | 9/2007 | Liang et al. | |
| 7,342,477 | B2 | 3/2008 | Brandt et al. | |
| 8,593,244 | B2 * | 11/2013 | Huang et al. | 336/73 |
| 2002/0122317 | A1 | 9/2002 | Koshita et al. | |
| 2004/0012472 | A1 | 1/2004 | Sasse et al. | |
| 2010/0066474 | A1 | 3/2010 | Huang et al. | |

* cited by examiner

CONTROL OF LEAKAGE INDUCTANCE

CROSS-REFERENCE TO RELATED APPLICATIONS

This application claims priority from and is a continuation of U.S. patent application Ser. No. 12/212,922, entitled "CONTROL OF LEAKAGE INDUCTANCE," filed Sept. 18, 2008, the entire contents of which are expressly incorporated herein by reference.

FIELD OF THE DISCLOSURE

The present disclosure is generally related to controlling leakage inductance in magnetic devices such as transformers and inductors.

BACKGROUND

Electrical transformers commonly are affected by leakage inductance in which one or more windings in a conductive coil exhibit an individual self-inductance relative to other windings. The leakage inductance may result from design issues or manufacturing flaws that affect the configuration of one or more windings in the coil.

As a result of leakage inductance, the affected winding or windings alternately store or discharge magnetic energy causing a periodic voltage drop that interferes with voltage supply regulation when a load is coupled to the transformer. As a result, leakage inductance may pose a significant problem in electrical power conversion circuits, particular in systems that employ large energy storage and filtering components. It is desirable to control leakage inductance so that devices receiving power from electrical power conversion circuits will be supplied with a consistent voltage supply so that the performance of the devices will be consistent and reliable.

SUMMARY

One or more conductive windings in a closed loop disposed around a transformer across a magnetic field may be used to control leakage inductance and its effects. The closed loop windings resist changes in the field, thereby controlling leakage inductance. A closed loop including a single winding may be used to selectively inhibit a small degree of leakage inductance, while a closed loop including multiple windings may be used to selectively inhibit larger degrees of leakage inductance. A resistor in series in the closed loop can be used to further adjust leakage inductance, while using a variable resistor enables the closed loop to be tuned to control leakage inductance.

In a particular illustrative embodiment, a transformer is provided that includes a first conductive coil wound about a first coil axis and a second conductive coil wound about a second coil axis. The second conductive coil is disposed proximate to the first conductive coil and the second coil axis is substantially parallel to the first coil axis. A closed-loop conductive winding is disposed proximate to the first conductive coil and the second conductive coil. The closed-loop conductive winding is wound about a loop axis at least one time where the loop axis is substantially parallel to the first coil axis and the second coil axis.

In another particular illustrative embodiment, a conductive wrap includes a closed-loop conductor. The conductive wrap is wound at least one time around a loop axis that is substantially parallel to a first coil axis of a first conductive coil. The conductive wrap is disposed adjacent to the first conductive coil.

In another particular illustrative embodiment, a method includes wrapping a section of conductive material having a first conductor end and a second conductor end around a loop axis. The loop axis is proximate and substantially parallel to coil axes of two conductive coils of a transformer. The method further includes electrically coupling the first conductor end with the second conductor end to form a closed-loop conductive winding. The closed-loop conductive winding, disposed around the loop axis of the transformer, is configured to control a leakage inductance of the transformer.

The features, functions, and advantages that have been discussed can be achieved independently in various embodiments or may be combined in yet other embodiments further details of which are disclosed with reference to the following description and drawings.

DETAILED DESCRIPTION OF THE DRAWINGS

Particular illustrative embodiments disclosed herein describe using one or more conductive windings in a closed loop disposed proximate to a device such as a transformer or an inductor and within a magnetic field generated by the device. The closed loop windings resist changes in the field, thereby controlling leakage inductance and its effects. Particular illustrative embodiments include closed loops incorporating one or more conducting windings across the field depending on the degree of leakage inductance to be controlled. Other particular illustrative embodiments include fixed-value or variable resistors in the closed loop to selectively further control leakage inductance.

Figure 1:
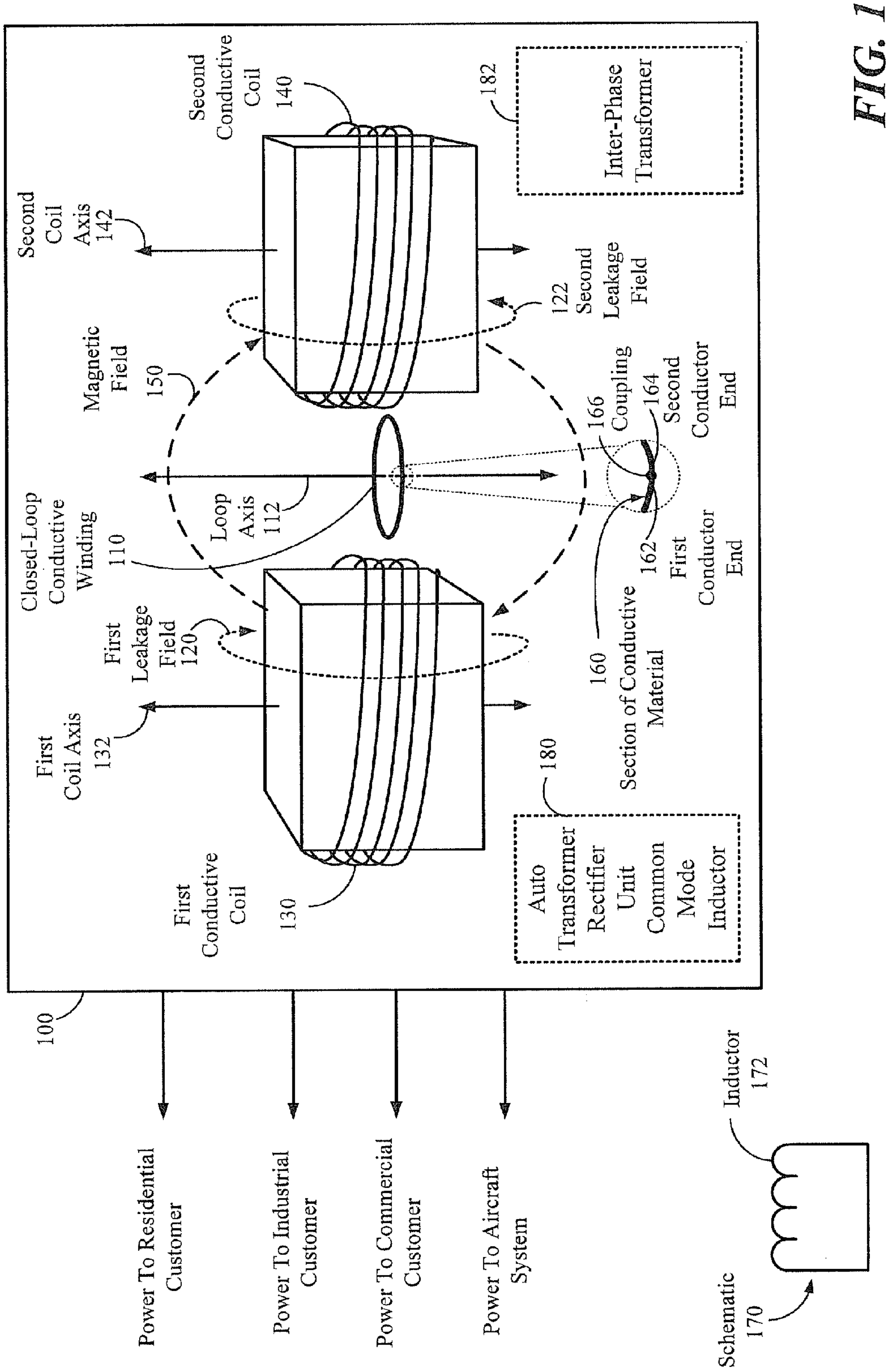
FIG. 1 is a perspective view of a first particular illustrative embodiment of an electrical transformer having a closed-loop conductive winding.

FIG. 1 is a perspective view of a particular illustrative embodiment of an electrical transformer 100 having two coils 130 and 140 and a closed-loop conductive winding 110 to control leakage inductance. The transformer 100 may include an electrical power conversion transformer that may include an auto transformer rectifier unit common mode inductor 180 or an inter-phase transformer 182. The closed-loop conductive winding 110 is used to control leakage inductance in the transformer 100. The transformer 100 may be used in a consumer electronics product such as a computer power supply. On a larger scale, the transformer may be used to supply power to residential, industrial, or commercial customers as indicated in FIG. 1. Also, the transformer may be used as part of an aircraft system where power conversion is used to provide power for systems configured to draw power at different voltage levels as indicated in FIG. 1.

The transformer 100 includes a closed-loop conductive winding 110 disposed proximate to a pair of conductive coils 130 and 140. A first conductive coil 130 of the transformer 100 is wound about a first coil axis 132. A second conductive coil 140 is wound about a second coil axis 142. The closed-loop conductive winding 110 is wrapped about a loop axis 112 that is substantially parallel to both the first coil axis 132 and the second coil axis 142.

Application of an electric current to the first conductive coil 130 results in the generation of a magnetic field 150. The magnetic field 150 induced by the first conductive coil 130 passes through the second conductive coil 140, inducing a current in the second conductive coil 140. In addition, the application of the electric current to the first conductive coil 130 results in leakage inductance that results in the generation of a first leakage field 120. Correspondingly, the current induced by the magnetic field 150 in the second conductive coil 130 results in a second leakage field 122. It should be noted that, in the example of FIG. 1, as well as in the examples of FIGS. 2-8, that application of an electric current to the second conductive coil 140 similarly would result in generation of a magnetic field capable of inducing an electric current in the first conductive coil 130.

The closed-loop conductive winding 110 opposes the leakage inductance and, thus, may be used to control the leakage inductance. As shown in a schematic diagram 170, the closed-loop conductive winding 110 constitutes an inductor 172. Inductors resist variations in current and, thus, fluctuations in the magnetic field passing through the inductor's coil. Consequently, the closed-loop conductive winding 110 will control or reduce the leakage inductance and, as a result, control or reduce the first leakage field 120 and the second leakage field 122 caused by the leakage inductance, thereby limiting or controlling the leakage inductance.

In one particular illustrative embodiment, the closed-loop conductive winding 110 is formed by taking a section of a conductive material 160 having a first conductor end 162 and a second conductor end 164 and wrapping the section of conductive material 160 around the loop axis 112. The closed-loop conductive winding 110 is formed by joining the first conductor end 162 and the second conductor end 164 at a coupling 166 or other joint, such as a solder connection.

Figure 2B:
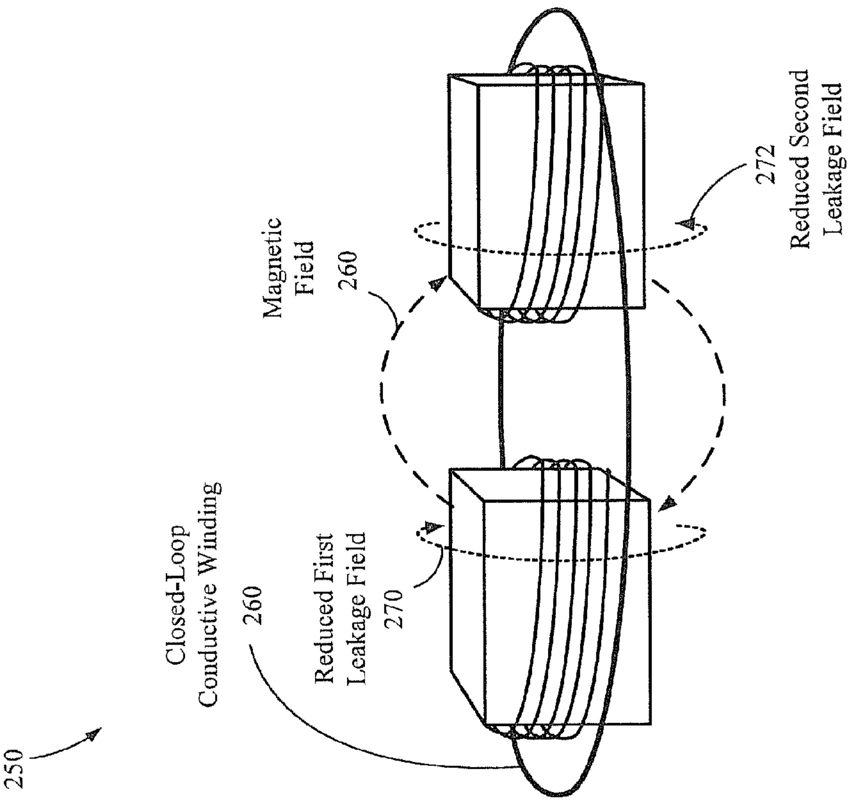
FIG. 2B is a perspective view of a second electrical transformer with a closed-loop conductive winding.
Figure 2A:
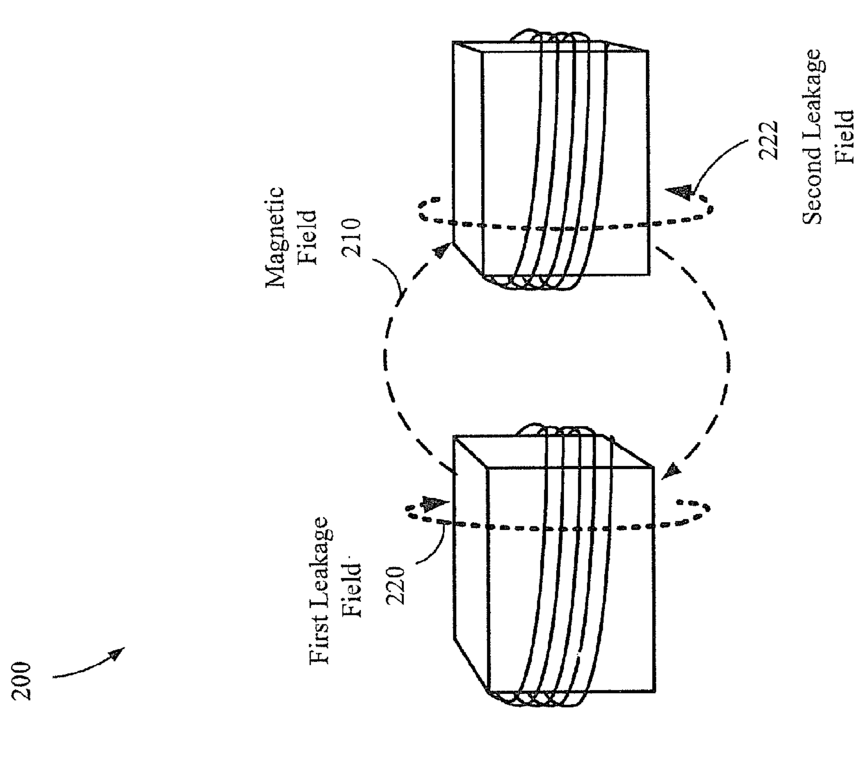
FIG. 2A (Prior Art)
FIG. 2A is a perspective view of a first (prior art) electrical transformer without a closed-loop conductive winding.

FIG. 2A shows a first (prior art) electrical transformer, generally designated 200, without a conductive winding. An application of an electric current in the first electrical transformer 200 results in a magnetic field 210 and leakage inductance results in the generation of a first leakage field 220 and a second leakage field 222 in the first electrical transformer 200.

FIG. 2B shows a second electrical transformer generally designated 250, with a closed-loop conductive winding 260 in accordance with an embodiment of the invention. An application of an electric current in the second electrical transformer 250 also induces a magnetic field 260. However, because of the closed-loop conductive winding 260, leakage inductance is controlled, resulting in a reduced first leakage field 270 and a reduced second leakage field 272. The reduced leakage fields 270 and 272 in the second electrical transformer 250 are represented with thinner dotted lines as compared to the thicker dotted lines representing the leakage fields 220 and 222 in the first electrical transformer 200.

Figure 3:
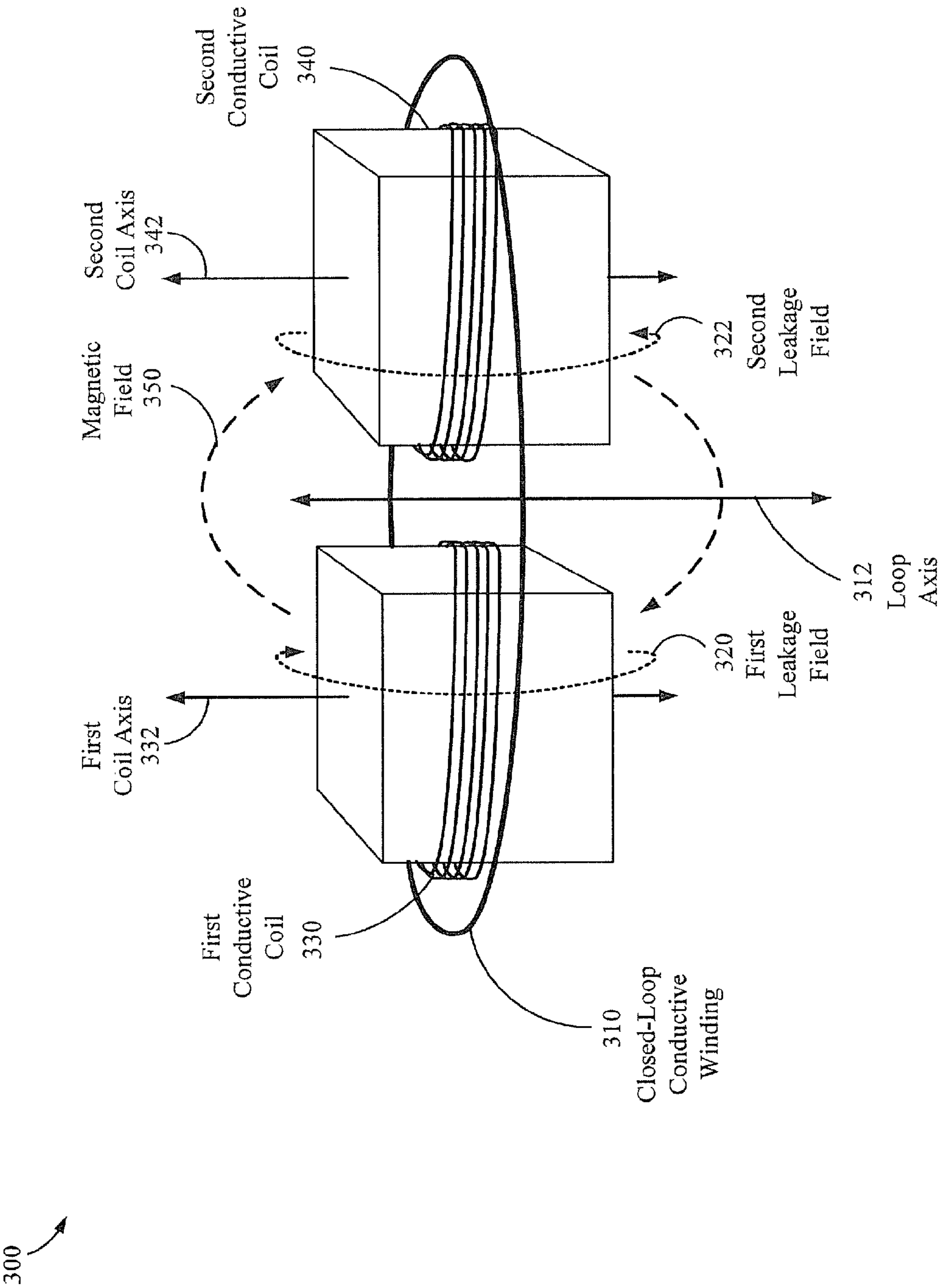
FIG. 3 is a perspective view of a second particular illustrative embodiment of an electrical transformer having a closed-loop conductive winding.

FIG. 3 is a perspective view of a particular illustrative embodiment of an electrical transformer, generally designated 300, having two conductive coils 330 and 340 and a closed-loop conductive winding 310 to control leakage inductance. The transformer 300 includes a transformer axis 312 about which the closed-loop conductive winding 310, a first conductive coil 330, and a second conductive coil 340 are wound. However, in contrast to the electrical transformer 100 of FIG. 1, instead of the conductive winding 310 being disposed between the first conductive coil 330 and the second conductive coil 340 as the conductive winding 110 was disposed between the first conductive coil 130 and the second conductive coil of the transformer 100, the conductive winding 310 is disposed around an outside of both the first conductive coil 330 and the second conductive coil 340.

In the electrical transformer 300 of FIG. 3, similar to the transformer 100 of FIG. 1, for example, application of an electric current to the first conductive coil 330 results in a magnetic field 350. The magnetic field 350 induced by the electric current applied to the first coil 330 passes through the second conductive coil 340, inducing an electric current in the second conductive coil 340. Also similar to the transformer 100 of FIG. 1, application of the electric current results in the generation of a first leakage field 320 around the first conductive coil 330 and a second leakage field 322 around the second conductive coil 340.

In the particular illustrative embodiments of the electrical transformer 100 of FIG. 1 and the electrical transformer 300 of FIG. 3, the closed-loop conductive windings 110 and 310 include a single wrap of a conductor. The single wrap of the conductor is sufficient to control small-scale inductance leakage, as passing a current through a single-wrap conductive coil will result in the generation of a small-scale magnetic field. To control larger-scale leakage inductances, additional windings of a conductor used in the closed-loop conductive loop or inclusion of a resistor in the closed loop may be used to further control inductance leakages, as illustrated in FIGS. 4-8.

FIGS. 4-8 illustrate embodiments of electrical transformers similar to the electrical transformer 100 of FIG. 1. For example, the physical configuration of a transformer 400 of FIG. 4, including the configuration of conductive coils 430 and 440 of the electrical transformer 400, is the same as the physical configuration of the conductive coils 130 and 140 of the electrical transformer 100. Similarly, application of an electric current to a first conductive coil 430 of the electrical transformer 400 will generate a magnetic field 450 that induces a current in the second conductive coil 440 of the electrical transformer 400, just as application of an electric current to the first conductive coil 130 of the electrical transformer 100 will generate a magnetic field that will induce a current in the second conductive coil 130 of the electrical transformer 100. Also, application of the electric current will result in a first leakage field 420 and a second leakage field 422. The electrical transformers 500-800 of FIGS. 5-8 also have a same physical configuration of coils as the electrical transformer 100 and respond to the application of an electric current in the same way. Thus, the transformers 400-800 of FIGS. 4-8 are physically configured to be the same as the transformer 100 of FIG. 1 and are configured to operate in substantially the same way as the transformer of FIG. 1. However, each of the transformer 100 of FIG. 1 and the transformers 400-800 of FIGS. 4-8 are configured with different embodiments of closed-loop conductive windings, as further described below. Further, it should be noted that closed-loop conductive windings described with reference to FIGS. 4-8 may be disposed around an outside of the conductive coils of the electrical transformer, as the closed-loop conductive wrap 310 is wrapped about the outside of the conductive coils 330 and 340 in the electrical transformer 300 of FIG. 3, instead of disposed between the conductive coils 130 and 140 as in the electrical transformer 100 of FIG. 1.

Figure 4:
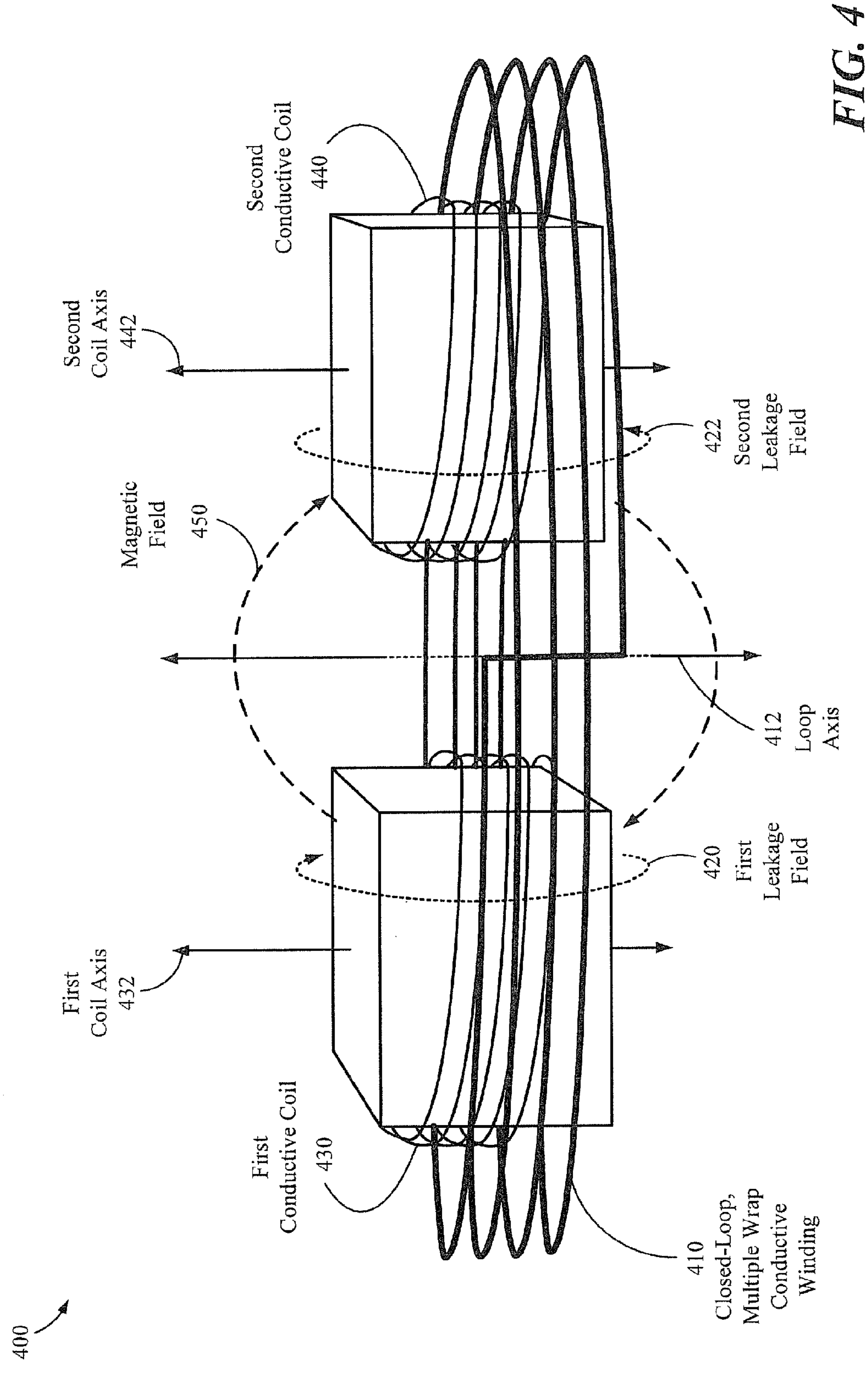
FIG. 4 is a perspective view of a third particular illustrative embodiment of an electrical transformer having a closed-loop conductive winding.

FIG. 4 is a perspective view of a particular illustrative embodiment of an electrical transformer, generally designated 400, having a first conductive coil 430 and a second conductive coil 440 and a closed-loop, multiple-wrap conductive winding 410. The multiple-wrap conductive winding 410 is wound around a loop axis 412 that is substantially parallel to a first coil axis 432 and a second coil axis 442 about which the first conductive coil 430 and the second conductive coil 440 are wound, respectively. Application of an electric current to the first conductive coil 430 results in a magnetic field 450 as well as a first leakage field 420 and a second leakage field 422. The leakage inductance that results in generation of the first leakage field 420 and the second leakage field 422 may be controlled with the closed-loop, multiple-wrap conductive winding 410.

The closed-loop, multiple-wrap conductive winding 410 further reduces the leakage inductance. For example, a single-wrap conductive winding may reduce leakage inductance from 20 microhenries to 10 microhenries. On the other hand, a multiple-wrap conductive winding including 10 wraps of a conductor may reduce 20 microhenries to 5 microhenries. A number of wraps may be used in the conductive winding to provide a selective degree of leakage inductance control.

Figure 5:
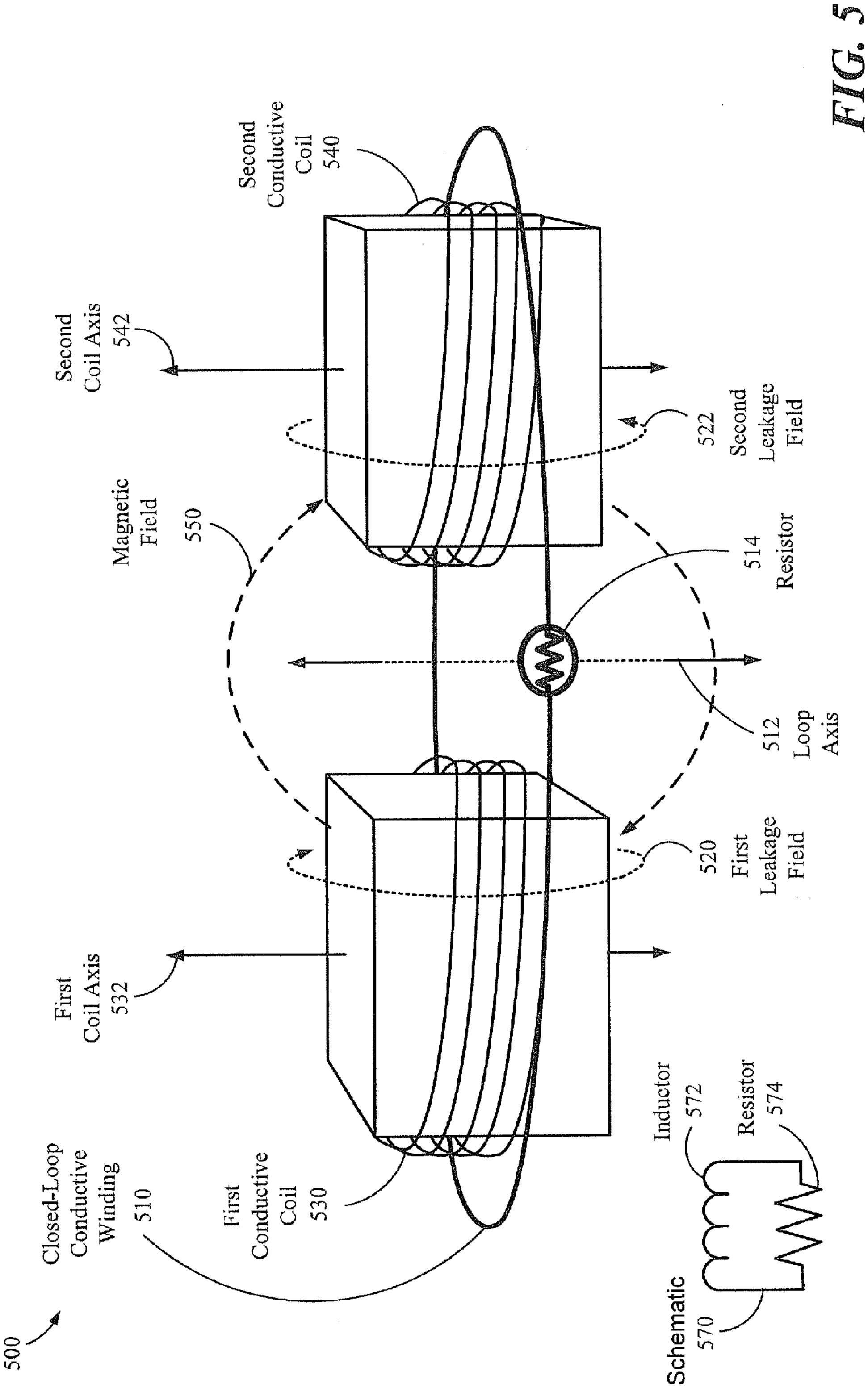
FIG. 5 is a perspective view of a fourth particular illustrative embodiment of an electrical transformer having a closed-loop conductive winding.

FIG. 5 is a perspective view of a particular illustrative embodiment of an electrical transformer, generally designated 500, having a first conductive coil 530 and a second conductive coil 540 and a closed-loop, single-wrap conductive winding 510. Application of an electric current to the first conductive coil 530 results in generation of a magnetic field 550 as well as generation of a first leakage field 520 and a second leakage field 522. The closed-loop conductive winding 510 is wound around a loop axis 512 that is substantially parallel to a first coil axis 532 and a second coil axis 542 about which the first conductive coil 530 and the second conductive coil 540 are wound, respectively. The single-wrap conductive winding 510 is coupled in series with a resistor 514. The resistor 514 further reduces the leakage inductance. A schematic 570 of the closed-loop, single-wrap conductive winding 510 includes an inductor 572, presented by the winding of the conductor, in series with a resistor 574.

The resistor 514 opposes a flow of current in the conductive winding 510. Thus, the resistance imposed by the resistor 514 included in the closed-loop conductive winding 510 opposes a first leakage field 520 and a second leakage field 522. The lower the resistance value chosen for the resistor 514, the greater will be the opposition to and the control of the first leakage field 520 and the second leakage field 522 caused by leakage inductance.

Figure 6:
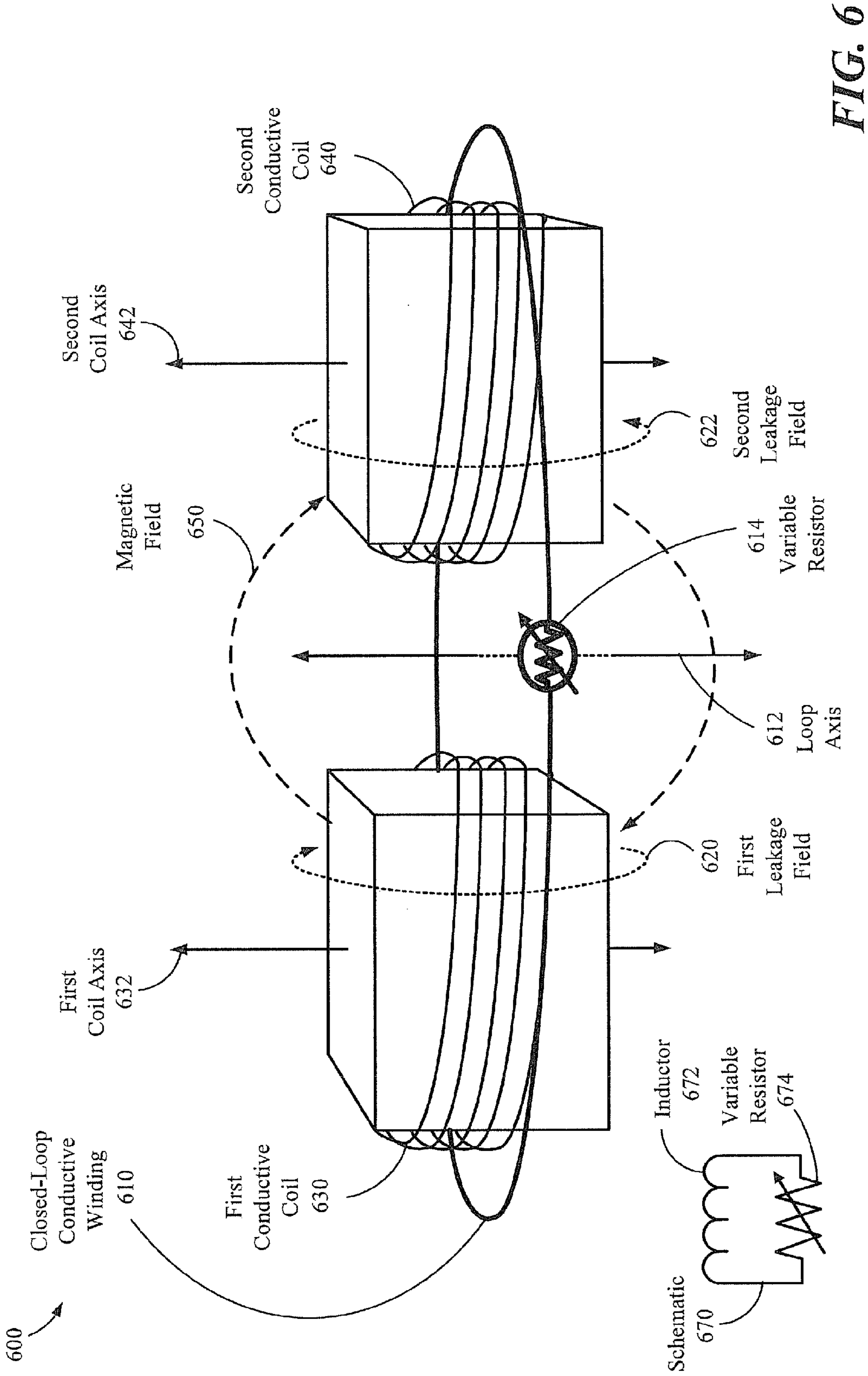
FIG. 6 is a perspective view of a fifth particular illustrative embodiment of an electrical transformer having a closed-loop conductive winding.

FIG. 6 is a perspective view of a particular illustrative embodiment of an electrical transformer, generally designated 600, having a first conductive coil 630 and a second conductive coil 640 and a closed-loop, single-wrap conductive winding 610. The closed-loop conductive winding 610 is wound around a loop axis 612 that is substantially parallel to a first coil axis 632 and a second coil axis 642 about which the first conductive coil 630 and the second conductive coil 640 are wound, respectively. Application of an electric current to the first conductive coil 630 results in generation of a magnetic field 650 as well as generation of a first leakage field 620 and a second leakage field 622. The single-wrap conductive winding 610 is coupled in series with a variable resistor 614. A schematic 670 of the closed-loop, single-wrap conductive winding 610 includes an inductor 672, presented by the winding of the conductor, in series with a variable resistor 674. Thus, a resistance of the closed-loop conductive winding 610 imposed by the variable resistor 614 opposes a flow of current in the closed-loop conductive winding 610 and, thus, opposes the first leakage field 620 and the second leakage field 622 resulting from the leakage inductance. The opposition to the first leakage field 620 and the second leakage field 622 may be controlled by changing a resistance value of the variable resistor 614.

Figure 7:
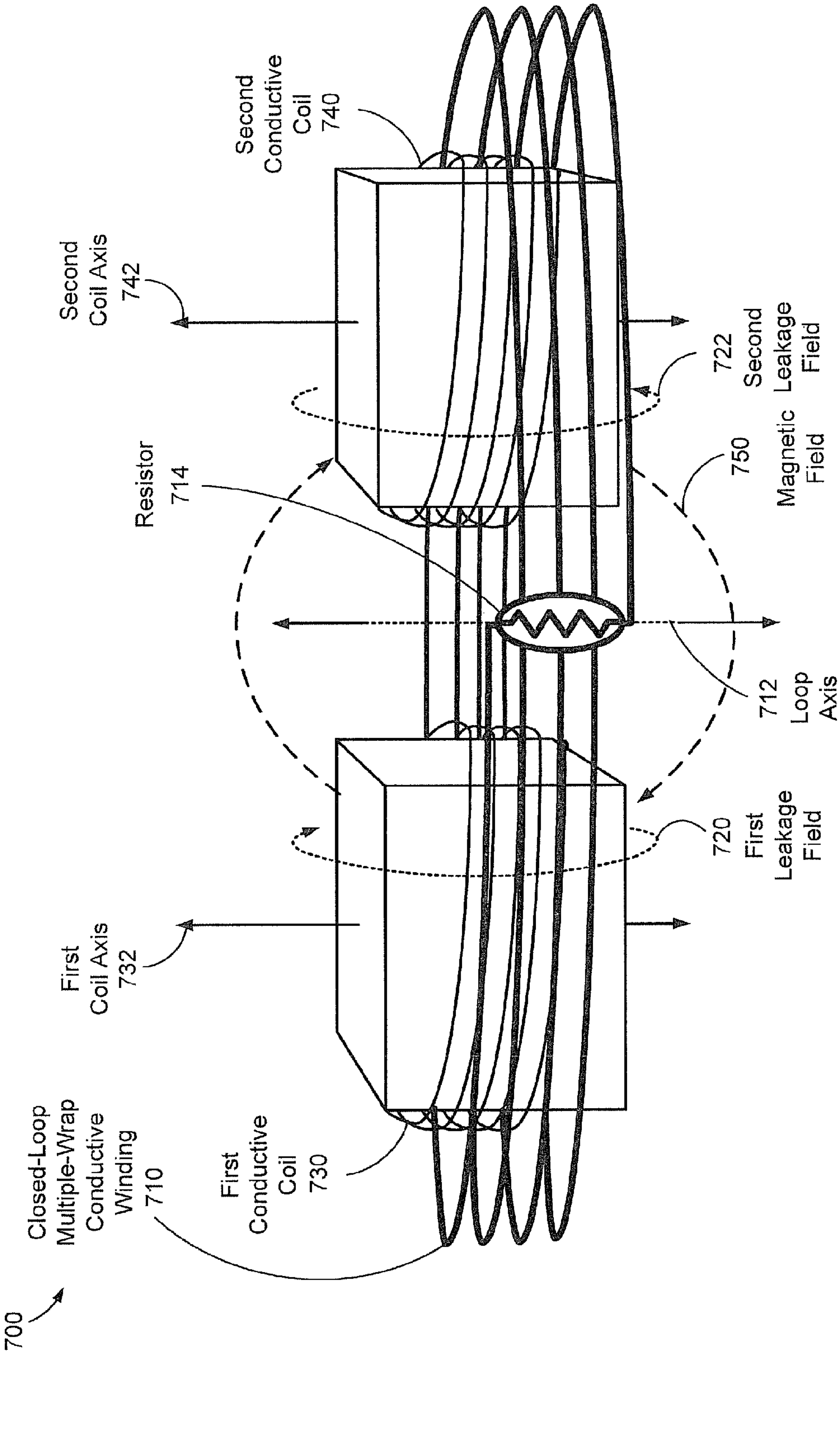
FIG. 7 is a perspective view of a sixth particular illustrative embodiment of an electrical transformer having a closed-loop conductive winding.

FIG. 7 is a perspective view of a particular illustrative embodiment of an electrical transformer, generally designated 700, having a first conductive coil 730 and a second conductive coil 740 and a closed-loop, multiple-wrap conductive winding 710 and a fixed-value resistor 714 in series with the conductive winding 710. The closed-loop conductive winding 710 is wound around a loop axis 712 that is substantially parallel to a first coil axis 732 and a second coil axis 742 about which the first conductive coil 730 and the second conductive coil 740 are wound, respectively. Application of an electric current to the first conductive coil 730 results in generation of a magnetic field 750 as well as generation of a first leakage field 720 and a second leakage field 722. As previously described with reference to FIG. 4, a conductive winding including multiple wraps of the conductor may further control leakage inductance. Further, as previously described with reference to FIG. 5, including a resistor in series with the closed-loop conductive winding further opposes the induction of current in the closed-loop conductive winding 710 and, thus, opposes the first leakage field 720 and the second leakage field 722 caused by leakage inductance. Therefore, combining a multiple-wrap conductive winding 710 and a resistor 714 enables further leakage inductance control. A number of wraps of the conductor in the conductive winding 710 and a resistance value of the resistor 714 may be chosen to selectively control leakage inductance and its effects.

Figure 8:
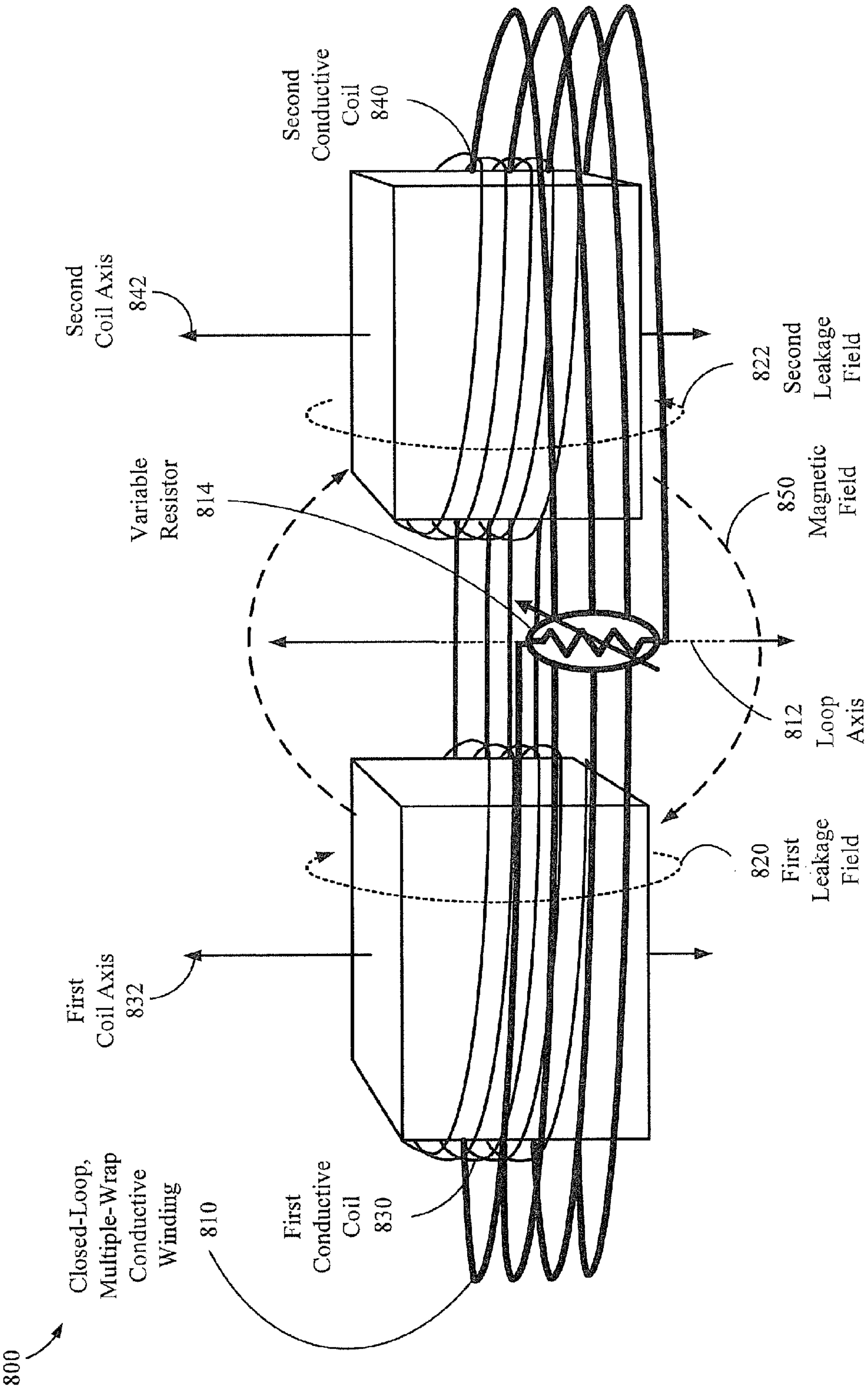
FIG. 8 is a perspective view of a seventh particular illustrative embodiment of an electrical transformer having a closed-loop conductive winding.

FIG. 8 is a perspective view of a particular illustrative embodiment of an electrical transformer, generally designated 800, having a first conductive coil 830 and a second conductive coil 840 and a closed-loop, multiple-wrap conductive winding 810 and a variable resistor 814 in series with the conductive winding 810 to control leakage inductance. The closed-loop conductive winding 810 is wound around a loop axis 812 that is substantially parallel to a first coil axis 832 and a second coil axis 842 about which the first conductive coil 830 and the second conductive coil 840 are wound, respectively. Application of an electric current to the first conductive coil 830 results in generation of a magnetic field 850 as well as generation of a first leakage field 820 and a second leakage field 822. As previously described with reference to FIG. 7, the combination of the number of windings of the conductor used in the conductive winding 710 and a resistance value as a result of the setting of the variable resistor 714 may be chosen to selectively oppose the leakage fields 720 and 722 and thereby control leakage inductance and its effects. The multiple-wrap, closed-loop conductive winding 810 coupled in series with the variable resistor 814 will oppose the first leakage field 820 and the second leakage field 822 to control leakage inductance and its effects. Inclusion of variable resistor 814 allows for the resistance value to be selectively changed to control leakage inductance and its effects.

Figure 9:
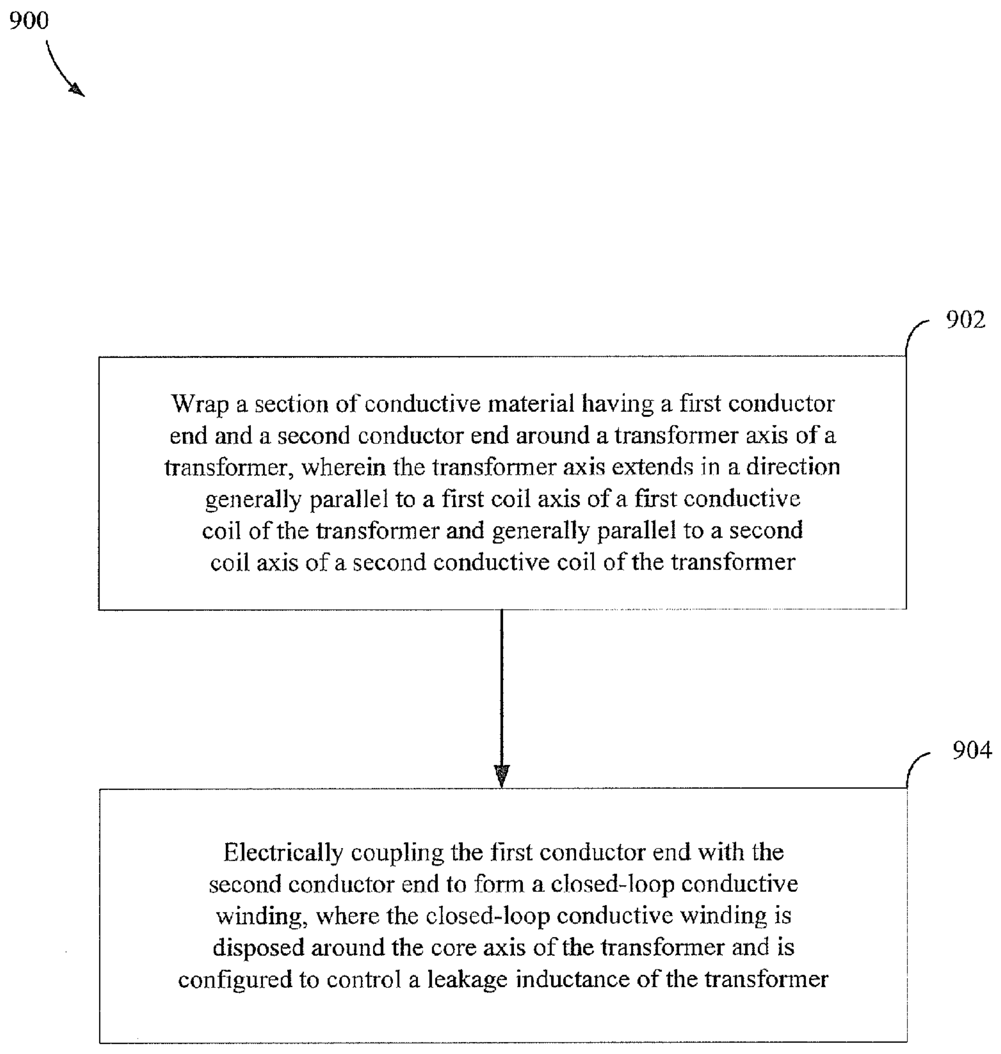
FIG. 9 is flow chart of a particular illustrative embodiment of a method of controlling leakage inductance in a transformer or multiple winding inductor.

FIG. 9 is flow chart 900 of a particular illustrative embodiment of a method of controlling leakage inductance in a transformer or a multiple winding inductor. At 902, a section of conductive material having a first conductor end and a second conductor end is wrapped around a transformer axis of a transformer. The transformer axis extends in a direction generally parallel to a first coil axis of a first conductive coil of the transformer and generally parallel to a second coil axis of a second conductive coil of the transformer. At 904, the first conductor end is electrically coupled with the second conductor end to form a closed-loop conductive winding. The closed-loop conductive winding disposed around the transformer axis of the transformer is configured to oppose leakage fields caused by leakage inductance and thereby control a leakage inductance of the transformer and its effects.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations, or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A transformer apparatus comprising:

a first conductive coil wound solely about a first coil axis;

a second conductive coil wound solely about a second coil axis that is distinct from the first coil axis, wherein the second coil axis is substantially parallel with the first coil axis, and the second conductive coil is disposed proximate the first conductive coil; and a closed-loop conductive winding disposed substantially around the first conductive coil and the second conductive coil, the closed-loop conductive winding being wound about a loop axis at least one time, the loop axis being orientated substantially parallel to the first coil axis and the second coil axis and being positioned substantially between the first coil axis and the second coil axis, wherein the closed-loop conductive winding is distinct from the first conductive coil and the second conductive coil, and wherein the closed-loop conductive winding is configured to control leakage inductance of at least one of the first conductive coil and the second conductive coil.

2. The transformer apparatus of claim 1, wherein the closed-loop conductive winding is wound about the loop axis multiple times.

3. The transformer apparatus of claim 1, wherein the transformer apparatus is configured to supply power to one of residential, industrial, and commercial customers.

4. The transformer apparatus of claim 1, wherein the transformer apparatus is included in an aircraft.

5. The transformer apparatus of claim 1, wherein the transformer apparatus includes an auto transformer rectifier unit common mode inductor.

6. The transformer apparatus of claim 1, wherein the transformer apparatus includes an inter-phase transformer.

7. The transformer apparatus of claim 1, wherein the closed-loop conductive winding includes only a conductive member.

8. The transformer apparatus of claim 1, wherein, during use, the closed-loop conductive winding is inductively coupled to the first conductive coil and the second conductive coil, and wherein the closed-loop conductive winding is electrically isolated from the first conductive coil and the second conductive coil.

9. The transformer apparatus of claim 1, further comprising a resistor coupled in series with the closed-loop conductive winding.

10. The transformer apparatus of claim 9, wherein the resistor includes a variable resistor.

11. An apparatus for controlling leakage inductance, the apparatus comprising:

a conductive wrap including a closed-loop conductor, the conductive wrap configured to be wound at least one time around a first conductive coil and a second conductive coil, the first conductive coil wound solely about a first coil axis and the second conductive coil wound solely about a second coil axis that is distinct from the first coil axis, wherein the conductive wrap is distinct from the first conductive coil and the second conductive coil, and wherein the conductive wrap is configured to be wound about a loop axis, the loop axis being positioned non-coaxially with the first coil axis and the second coil axis and orientated substantially parallel to and between the first coil axis and the second coil axis.

12. The apparatus of claim 11, wherein the conductive wrap is configured to be wound about the first conductive coil and the second conductive coil multiple times.

13. The apparatus of claim 11, wherein the first conductive coil includes an inductor.

* * * * *